United States Patent [19]

Boehm et al.

[11] 4,232,809

[45] Nov. 11, 1980

[54] APPARATUS FOR THERMALLY SEVERING GLASS

[75] Inventors: Hans W. Boehm, Toledo; Richard A. Herrington, Walbridge; Waldemar W. Oelke, Rossford, all of Ohio

[73] Assignee: Libbey-Owens-Ford Company, Toledo, Ohio

[21] Appl. No.: 30,177

[22] Filed: Apr. 16, 1979

Related U.S. Application Data

[60] Continuation-in-part of Ser. No. 905,687, May 15, 1978, abandoned, which is a division of Ser. No. 767,051, Feb. 9, 1977, Pat. No. 4,113,162.

[51] Int. Cl.³ .......................... B26F 3/00; B26F 3/12
[52] U.S. Cl. .................................... 225/93.5; 225/93; 225/96.5
[58] Field of Search ............... 225/2, 93.5, 96, 96.5, 225/93

[56] References Cited

U.S. PATENT DOCUMENTS

| 1,777,644 | 10/1930 | Hitner | 225/93.5 |
| 3,146,926 | 9/1964 | Huffman | 225/96.5 |
| 3,584,773 | 6/1971 | Grove et al. | 225/93.5 |
| 3,889,862 | 6/1975 | Insolio | 225/96.5 |
| 4,113,162 | 9/1978 | Boehm | 225/93.5 |

Primary Examiner—J. M. Meister
Attorney, Agent, or Firm—Collins, Oberlin & Darr

[57] ABSTRACT

A method of and apparatus for thermally severing thick glass sheets by applying an energized electrical resistance wire element against the glass surface coincident with the intended line of cut and providing mechanical means adjacent the starting end of the cut to spread the glass portions on opposite sides of the line apart as the cut begins to run from the starting end. A glass spreading arrangement also can be provided at the trailing end of the cut to assure a straight cut along the intended path from end to end.

11 Claims, 9 Drawing Figures

APPARATUS FOR THERMALLY SEVERING GLASS

CROSS REFERENCE TO RELATED APPLICATIONS

This application is a continuation-in-part of co-pending application Ser. No. 905,687, filed May 15, 1978, now abandoned, which in turn is a divisional application of application Ser. No. 767,051, filed Feb. 9, 1977, and now U.S. Pat. No. 4,113,162.

BACKGROUND OF THE INVENTION

The present invention relates generally to thermal cutting and, more particularly, to the thermal severing of relatively thick glass plates or sheets.

The art of thermally cutting relatively thick glass sheets or plates is becoming increasingly popular in an effort to overcome the arduous, time consuming cutting techniques of the prior art, such as scoring followed by breaking and diamond saw cutting, for example. The most common method of thermally severing glass involves nicking one edge of the glass sheet to form a score therealong in alignment with the intended line of cut and then applying radiant heat along the intended line of cut from a non-contact thermal source spaced from the glass sheet surface. However, the foregoing method is not very reliable in producing true straight cuts because it is believed that the radiant heat emanating from the source converges and enters the glass surface along the intended line of cut and then diverges as it propogates inwardly through the glass thickness. The progressively widening heated area creates at the tension layer, a heat band of substantially greater lateral extent than the intended line of cut. This can cause the glass to fracture uncontrollably in a meandering path along such band. Additionally, when attempting straight cuts which are offset from the centerline of a glass blank, the cut has a tendency to run in an arcuate path or bow into the narrower severed piece to produce a curved edge, sometimes referred to as a "banana edge".

The thermal cutting method and apparatus disclosed in U.S. patent application Ser. No.677,977, filed Apr. 19, 1976, assigned to the same assignee as the present invention, provided a solution to some of these problems by employing continuous surface contact, conductive heat against the surface of the glass sheet along the entire desired line of cut. While this thermal cutting technique has admirably served the purpose for which it was intended in severing thick glass sheets, it was found that, in addition to the thermal energy developed to effect the cut, a significant portion of such energy was consumed in physically moving the heavy severed pieces apart against the resistance offered by the supporting table. Also, compressive surface stresses induced in the glass blank as a result of the irregularities inherent in the glass supporting surface of a so-called "flat" table top posed problems in repeatedly making straight dimensional cuts.

SUMMARY OF THE INVENTION

Accordingly, it is a primary object of the present invention to provide a new and improved method of thermally severing glass sheets in a manner reserving substantially all of the thermal energy generated for effecting a controlled fracture.

It is another object of this invention to provide a new and useful thermal severing apparatus including means for physically spreading apart the severed portions as the running cut advances along a glass blank.

It is a further object of the present invention to provide the foregoing severing apparatus with a glass supporting surface having a slight convex curvature for virtually eliminating glass surface compression stresses.

The foregoing and other objects, advantages, and characterizing features of the present invention will become clearly apparent from the ensuing detailed description thereof considered in conjunction with the accompanying drawings wherein like reference characters denote like parts through the various views.

DESCRIPTION OF THE PREFERRED EMBODIMENT

Figure 1:
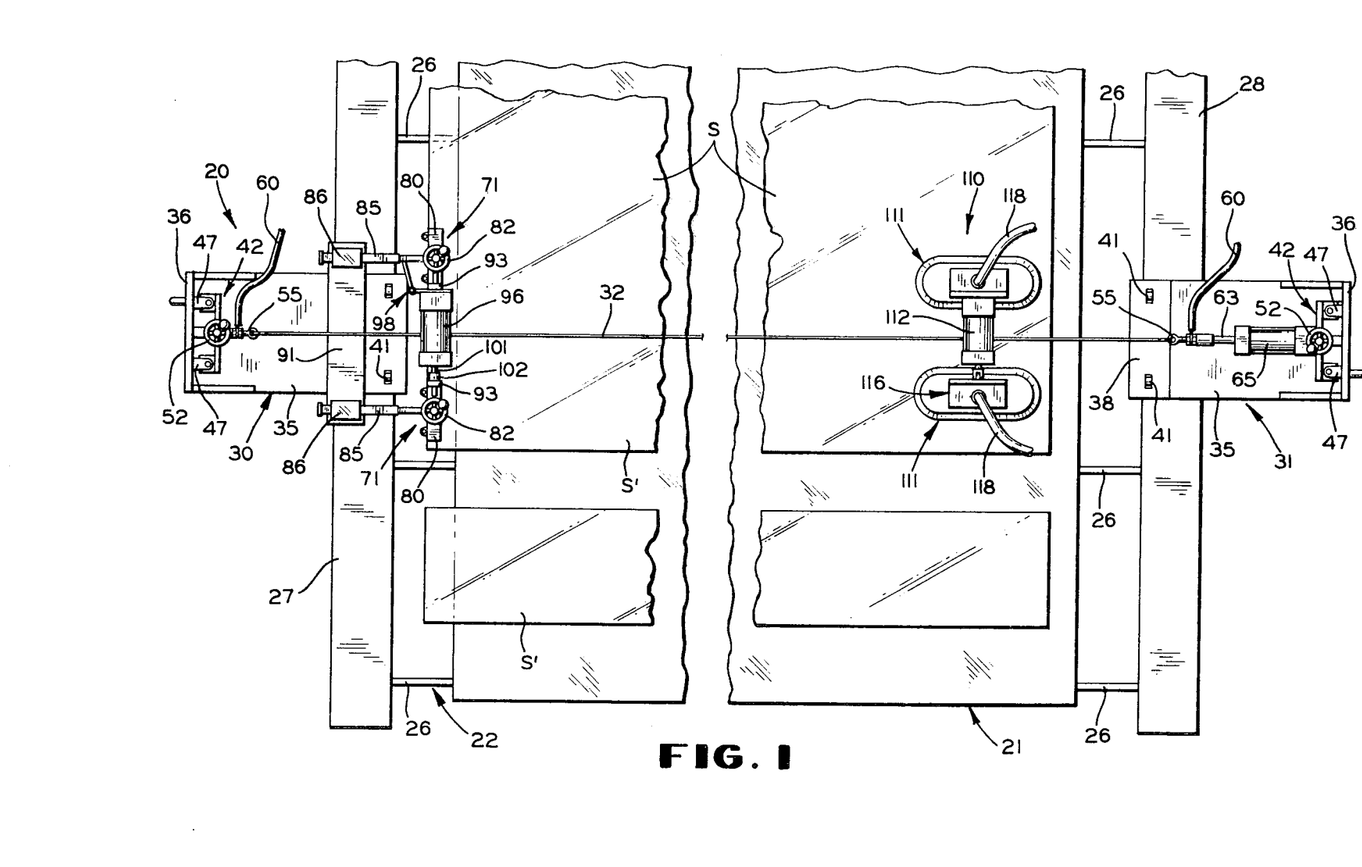
FIG. 1 is a fragmentary top plan view of a thermal severing apparatus, constructed in accordance with this invention.

Referring now in detail to the illustrative embodiment depicted in the accompanying drawings for carrying out this invention, there is shown in FIG. 1 a glass cutting apparatus, comprehensively designated 20, mounted on a glass supporting table, generally designated 21, having the usual support legs and structural members (not shown) constituting the frame 22 of the table. A pair of structural I-beams 23 (FIG. 2) and 25 are secured to frame 22 by a plurality of connecting members 26 and extend generally parallel to the opposite marginal edges of table 21 in spaced relation thereto. The beams 23 and 25 are provided with elongated plates 27 and 28 coextensive therewith welded or otherwise fixedly secured to the upper flanges thereof and which project laterally outwardly past the flanges to form guide rails for carriages 30 and 31, respectively, adapted to be reciprocated therealong. Carriages 30 and 31 support, in addition to other parts, the opposite ends of an electrical resistance element in the form of a fine wire 32 which constitutes the cutter element of this invention and is engageable with the upper surface of a glass blank or sheet S to provide surface contact, localized heat thereto for thermally severing the same, as will hereinafter be described in detail. One particular wire product which has been used successfully as an electrical resistance element is a nickel-chromium alloy sold by the Drivers-Harris Company of Harrison, N.J., under the trademark "Nichrome 5". While this product is preferable, it should be understood that any suitable wire material having high electrical resistivity and oxide-resistant properties and which will not deteriorate under elevated thermal conditions can be used in lieu of "Nichrome 5", as desired.

Figure 2:
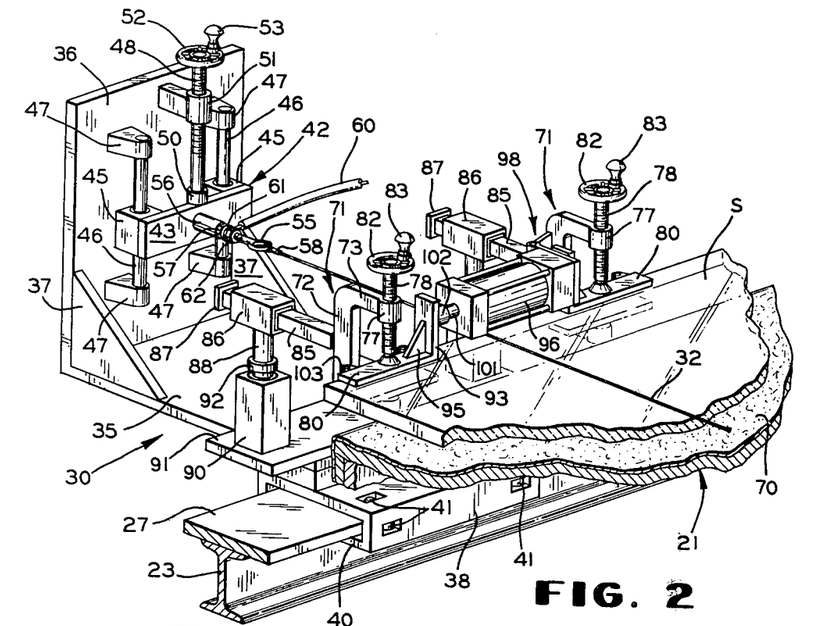
FIG. 2 is a fragmentary perspective view, on an enlarged scale, showing the mounting for one end of the electrical resistance heating wire element and the glass spreading apparatus of this invention.
Figure 3:
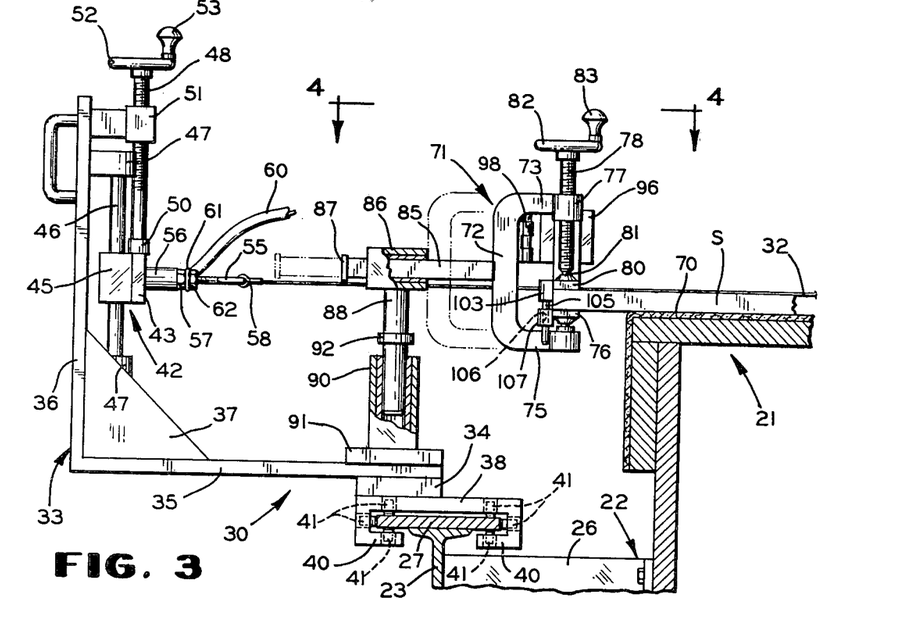
FIG. 3 is a vertical sectional view of the apparatus shown in FIG. 2.
Figure 4:
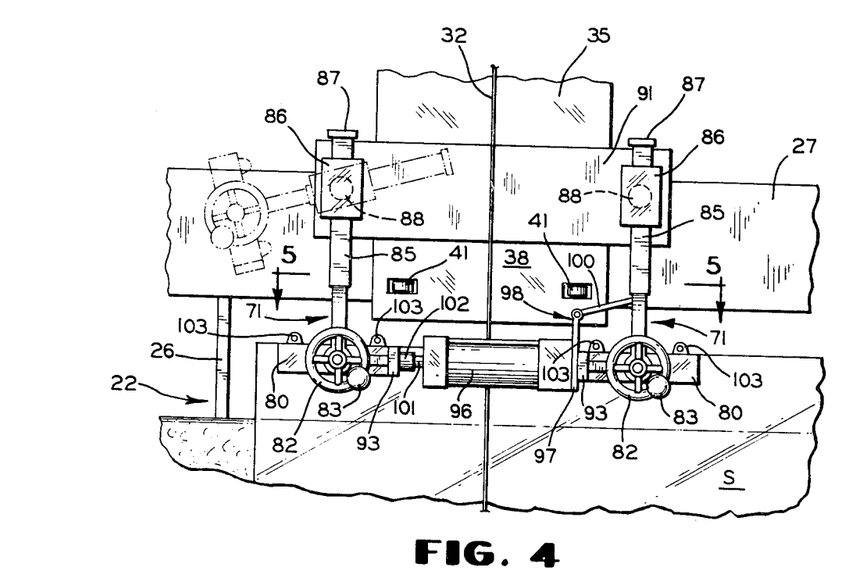
FIG. 4 is a fragmentary top plan view of the apparatus of FIG. 3, looking in the direction of arrows 4—4 of FIG. 3.

As best shown in FIGS. 2 and 3, carriage 30 comprises a generally L-shaped frame 33 formed of horizontal and vertical plates 35 and 36 welded or otherwise fixedly secured together and reinforced by suitable gussets 37. The horizontal plate 35 is rigidly affixed, via spacer 34, to a slide member 38 (FIG. 3) of a generally box-like configuration fitted about guide rail 27 and having inturned flanges 40 extending inwardly beneath the rail 27. A plurality of roller bearings 41 are mounted in the slide member 38 for rolling engagement with the top, bottom and edge surface of rail 27 to facilitate movement therealong.

The means for mounting one end of the electrical resistance element or wire 32 includes a slide 42 comprised of a plate 43 secured to a pair of spaced bearing blocks 45 for receiving and sliding on laterally spaced runners or shafts 46 extending vertically along plate 36 and which are mounted at their opposite ends in lugs 47 rigidly secured to and extending outwardly from vertical plate 36. Thus, slide 42 is mounted for vertical reciprocal movement on runners 46 relative to the carriage frame 33. The means for reciprocating slide 42 includes an upright screw 48 affixed at its lower end to slide 42 and journalled for rotation in a suitable bearing 50. The screw 48 is threaded through a fixed nut 51 connected to frame plate 36 so that rotation of the screw 48 effects axial movement thereof to raise or lower slide 42 as desired. A hand wheel 52 provided with a suitable knob 53 facilitates manual rotation of the screw 48.

The means for connecting wire 32 to slide 42 includes an eye bolt 55 threaded into an anchoring stud 56 attached to and projecting outwardly from the plate 43 of slide 42 and fixed in place by a suitable lock nut 57. The end of wire element 32 is provided with a suitable terminal 58 having a looped portion threaded through the eye of bolt 55. Electrical current is supplied to element 32 by a conductive lead 60 connected at one end to a suitable power source (not shown) and having a terminal 61 at the other end mounted on the threaded portion of eye bolt 55 and sandwiched between lock nut 57 and a nut 62.

Figure 6:
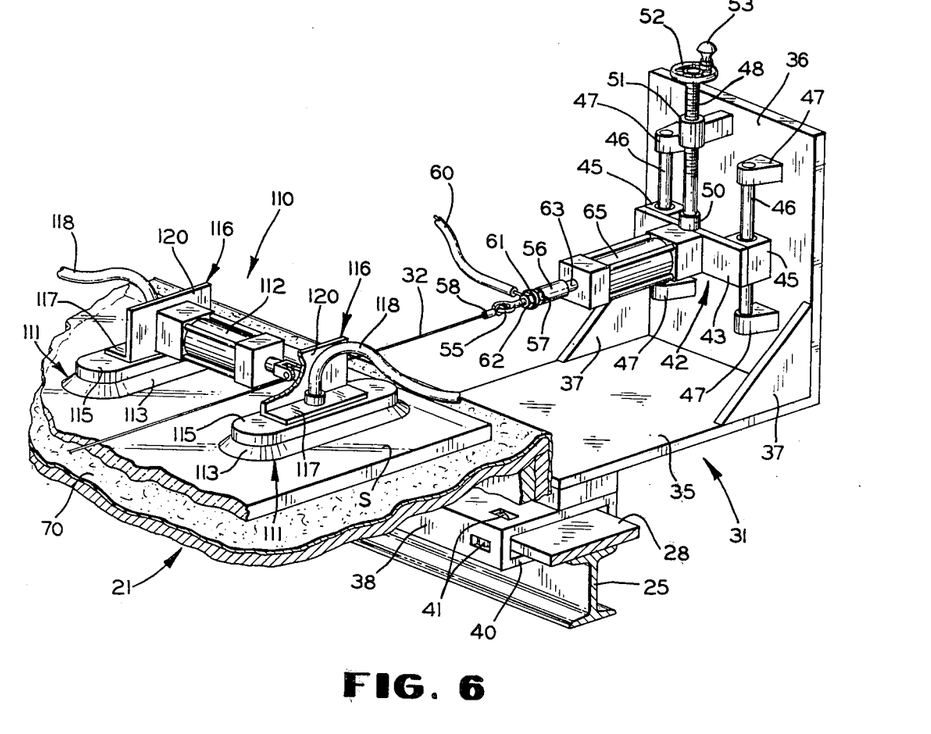
FIG. 6 is a fragmentary perspective view, on an enlarged scale, showing the mounting for the other end of the electrical resistance heating wire element along with a glass spreader of this invention.

Carriage 31 (FIG. 6) is similar to carriage 30 and like parts are identified by the same reference characters. Carriage 31 differs from carriage 30 by mounting the anchoring stud 56 for the other end of electrical resistance wire 32 to the piston rod 63 of a fluid actuating cylinder 65 secured to slide 42, rather than directly onto slide 42. The cylinder 65, connected to a suitable source of fluid under pressure (not shown), imposes a predetermined tension on the wire 32 to maintain it in a taut condition against the upper surface of the glass sheet S. The opposed anchoring studs 56 are in axial alignment and, via vertically adjustable slides 42, are disposed in a common horizontal plane slightly below the upper surface of the glass sheet to be severed. This, together with the arched configuration of the upper surface of the table 21, as will hereinafter be described, serves to maintain the wire 32 in continuous contact throughout with the upper surface of the sheet S along the entire length of the desired line of cut.

In cutting thick, heavy glass sheets or blanks supported on the usual flat table tops, it has been observed that a running cut sometimes hesitates, or stops and/or wanders from the intended line of cut. By the use of a laser measuring system, it was confirmed that some warpage is imparted to heavy glass plates or sheets laid directly on so-called "flat" table tops as a result of the sheets attempting to conform to the undulations and irregularities inherently existing in the table top surfaces. Additionally, the heavy glass sheet often is slightly bowed upwardly as a result of the annealing process during its formation and tends to flatten out when placed on a flat supporting surface. Such deformation induces compression stresses in the upper surface of the glass and the resulting surface compression has been measured to be sometimes as high as 1,000 psi. Such surface compression must be overcome before the glass will split to form the cut and is believed to be the underlying cause for the hesitation and meandering of the running cut occasionally experienced.

One important aspect of this invention resides in solving the above problem by minimizing, if not entirely eliminating, the surface compression of the sheet induced by the deformation thereof when placed on the supporting table top surface. To this end, table 21 is provided with an arched or arcuately shaped top wall 66, which is shown greatly exaggerated in FIG. 7, but is in fact very slight and virtually undiscernible by the human eye. The top wall 66 is supported on and rigidly secured to a plurality of laterally spaced structural members 67 forming a part of the table frame 22. The arcuate or convex configuration of top wall 66 defines a slightly curved or convex top wall surface 68, which is covered with a layer 70 of a non-abrasive material, such as felt for example. When a heavy glass blank or sheet of rather large longitudinal and lateral dimensions is placed on the arcuately curved supporting surface 68, the weight of the glass will cause it to assume the same curvature, i.e. a slightly convexly bowed configuration, and virtually eliminate any compressive stress build-up along the upper surface of the sheet as would otherwise occur if supported on a so-called "flat" supporting surface.

Figure 7:
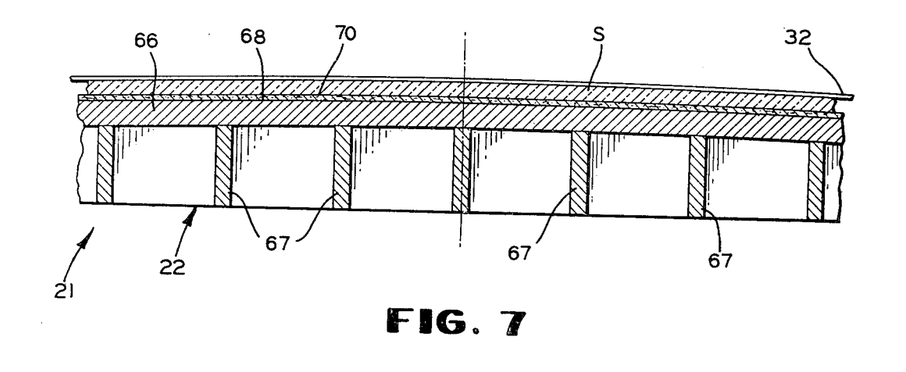
FIG. 7 is a fragmentary, cross sectional view cut through the upper portion of a glass supporting table used in conjunction with this invention.

The curvature of supporting surface 68 is perfectly arcuate in shape and defines an arc that can have radii ranging from about 300 feet to approximately 2800 feet. Since any degree of convex curvature in surface 68 will effect a reduction in the compressive stresses adjacent the upper surface of the glass sheet resting on supporting surface 68, the radius of the arc can approach infinity, i.e. approach substantially, but not quite, a flat surface. However, from a practical standpoint, the above noted range of from about 300 feet to 2800 feet, and preferably a radius in the range of 800 feet to 1400 feet, will achieve the desired reduction in compressive stresses adjacent the upper surface of the glass sheet resting on supporting surface 68.

As a specific example of a convexly curved table top surface that has been successfully employed in a glass cutting operation to relieve surface compressive stresses in a heavy glass sheet of approximately ¾ inch thickness, a table approximately 200 inches long was constructed and the supporting surface was formed to have an arcuate, convex curvature culminating at an apex about ⅜ of an inch above the 200 inch chord line of the table, thus establishing a curvature radius of 1111 feet.

The axis of the arc forming the curvature extends in a direction normal to the desired line of cut, and in the embodiment shown, normal to the electrical resistance wire 32 overlying the glass sheet and which will effect the cut. While the arched table top configuration of this invention is shown utilized in conjunction with a thermal cutting operation, it should be understood that the arcuate table top is in no manner limited in use therewith, but has utility in any cutting operation where it is desired to relieve, if not completely eliminate, compressive stresses otherwise present at the upper surface of a glass sheet. The axis of the arc forming the curvature extends in a direction normal to the desired line of cut, regardless of the means for effecting such cut.

While not utilized during the cutting operation, a cushion of air can be provided for supporting the glass sheet or blank to facilitate moving and positioning the same on table 21, if desired. To this end, top wall 66 can be perforated and the area below top wall 66 can serve as a plenum chamber connected to a suitable pressurized air source (not shown). Thus, air under pressure in the plenum chamber will flow through the perforated top wall and be diffused through the felt layer 70 to form such air cushion.

As disclosed in the aforementioned commonly owned U.S. patent application Ser. No. 677,977, thermal glass cutting involves the application of heat to a surface of the glass along the intended line of cut to produce a thermal differential line extending through the thickness of the sheet and along which the compressive stresses adjacent the surface are decreased while the tensile stresses within the central region or core of the sheet are increased until reaching a level at which the glass will fracture along the thermal differential line. It has been found that the most efficient technique for consistently producing true linear thermal cuts, especially in thick glass sheets of large linear dimensions, is to apply surface contact, conductive heat along a continuous path coextensive with the intended line of cut to confine or localize the applied heat to such thermal differential line as the heat migrates inwardly through the glass thickness. It is very important that the heat conductor fully engage or make continuous contact with the glass surface along the entire length of cut desired without any interruption or discontinuities therealong; otherwise, the cut will run uncontrollably and wander or deviate from the desired path.

Prior attempts to utilize a thin heated wire to supply the necessary surface contact, conductive heat for thermal glass cutting have not been entirely successful because of the difficulty in maintaining continuous contact of the heated wire with the underlying glass surface over the entire length of the intended line of cut. If the heat conductive wire was simply laid on or placed against the glass surface, the inherent irregularities and undulations of the wire would abort continuous glass contact throughout. On the other hand, if the wire was stretched taut over the edges of the glass in an effort to straighten out the irregularities and undulations inherent therein, the wire would bulge or bow slightly above the glass surface intermediate the edges thereof to also prevent continuous contact throughout. However, imposing a predetermined arch or bow in the glass supporting surface to in turn cause the glass sheet to assume a complementary bow, as is done in the present invention, causes the wire to conform to the convex curvature of the sheet and assures continuous line contact of the wire with the glass surface over the entire length of the intended line of cut. Thus, not only does the arcuate curvature of the glass supporting surface 68 avoid undesirable build up of glass surface stresses that impair cutting, but also maintains the heat conducting wire in positive, continuous engagement with the underlying glass surface over the entire length of the intended line of cut.

When thermally cutting glass, there is a tendency for the severed portions to separate progressively along the cut and move apart outwardly away from each other, leaving a wedge-like opening between the severed pieces. By way of example, thermally cutting a ¾ inch thick glass sheet 200 inches long forms an elongated wedge-shaped opening having a width between the pieces of about ¼ of an inch at the starting end of the cut with no separation at the other or remote end. It can be readily appreciated that a large amount of energy is necessary to move the heavy, severed glass portions apart against the frictional resistance offered by the conventional felt covered table. Accordingly, much of the thermally induced stresses generated to shear or fracture the glass is consumed in physically moving the severed glass pieces apart. It is believed that the dissipation of such thermal energy also accounts for some of the undesirable deviation from the intended path sometimes experienced when running a cut, as well as the formation of rough and irregular severed edges and the non-perpendicularity of such edges relative to the major surfaces of the sheet.

A significant feature of the present invention resides in overcoming the above problem by employing mechanical means to physically move the severed glass portions apart as cutting progresses and thereby utilize all of the available thermal energy solely for effecting the cut. To this end, a pair of laterally spaced C-clamps, generally designated 71 (FIGS. 2-5), are mounted on carriage 30 for clamping the glass blank or sheet S on opposite sides of the intended cut. Each clamp 71 comprises a web 72 having vertically spaced upper and lower horizontal extensions 73 and 75. The lower extension 75 supports a fixed lowered jaw member 76 while the upper extension 73 is provided with a nut 77 for threadably receiving an upright screw 78 having an adjustable jaw member 80 affixed to the lower end thereof as by means of a universal joint 81. The upper end of screw 78 is provided with a hand wheel 82 having a knob 83 to facilitate manual turning thereof.

The web 72 of each C-clamp 71 is provided with an integral, horizontally extending slide bar 85 telescopically receiving in a bearing block 86 for free reciprocal sliding movement therein. A flange 87 formed on the distal end of bar 85 serves as a stop limiting inward movement of the bar and thereby C-clamp 71. Bearing block 86 is provided with an integral rod 88 projecting vertically downwardly therefrom and which is freely slidably and rotatably received in a bearing block 90 carried by support plate 91 rigidly secured to the horizontal plate 85 of carriage 30. Rod 88 is provided with an enlarged diameter portion forming a shoulder 92 which serves as a stop for limiting downward movement of rod 88 and thereby C-clamp 71. It will be seen that the above arrangement permits each C-clamp to be moved axially horizontally towards and away from table 21 and vertically relative thereto. Also, C-clamp 71 can be pivoted in a horizontal direction about an axis defined by freely rotatable rod 88 between an operative glass engageable position adjacent table 21 shown in full lines in FIG. 4 and an inoperative, out-of-the way, glass disengageable position, shown in dotted lines in FIG. 4.

As best shown in FIG. 2, the adjustable jaw 80 of each C-clamp 71 is in the form of an elongated flat member provided at one end thereof with an upright plate 93 welded or otherwise fixedly secured thereto and reinforced by a gusset 95. Means are provided for physically moving the opposed plates 93 and thereby the two C-clamps 71 apart, such means preferably comprising a fluid actuating cylinder 96 mounted at its head end to one leaf 97 of a pivotal hinge assembly 98, the leaf 97 in turn secured to one of the upright plates 93. The other leaf 100 of hinge assembly 98 is attached at its outer edge to the web 72 of the adjacent C-clamp 71. Thus, cylinder 96 is attached to one of the C-clamps 71 for movement therewith. Cylinder 96 is provided with the usual reciprocal piston (not shown) connected to a piston rod 101 having an abutment member 102 adapted to engage and bear against the opposite plate 93 forming a part of the adjustable jaw 80 of the other C-clamp 71. Thus, fluid under pressure from a suitable source (not shown) directed to the head end of the cylinder 96 forces the piston therein and the attached piston rod 101 outwardly against plate 93 to force the two C-clamps 71 apart.

Each adjustable jaw 80 also is provided with spaced stop lugs 103 adapted to engage the leading edge of glass sheet S to properly position the associated jaw 80 thereon. These lugs 103 are fitted with guide pins 105 (FIG. 5) projecting downwardly therefrom for insertion in aligned openings 106 formed in spaced lugs 107 affixed to the lower jaws 76. Accordingly, each set of upper and lower jaws 80, 76 are maintained in vertical alignment during relative movement toward and away from each other.

The mode of operation of the apparatus of this invention will be described in connection with a commercial operation for producing very long, narrow strips of relatively thick glass, such as are utilized as stabilizers in architectural applications for example. In operation, with C-clamp 71 swung away from the table 21 in an out-of-way position, a large glass blank or sheet S is placed and properly oriented on the upper convexly shaped surface of table 21. The weight of the glass causes it to conform to the shape of the slightly arched configuration of the supporting surface 68, thus avoiding any undesirable stress development in the upper surface of the sheet. The carriages 30 and 31 are then moved along their respective guide rails 27 and 28 and positioned therealong to vertically align the electrical resistance wire 32 with the desired line of cut. When the wire is properly aligned with the desired line of cut, the slides 42 are lowered to bring the wire into engagement with the upper surface of the sheet coincident with the desired line of cut, the wire also assuming the convex curvature imparted to the glass upper surface to maintain it in continuous, uninterrupted contact throughout with the glass surface. The opposite ends of the wire projecting past the table end portions can be disposed just slightly lower than the table end portions to assure this continuous glass contact along the entire length of the glass.

After the wire 32 is properly oriented against the glass surface, the C-clamps 71 are swung into position on opposite sides of wire 32, moving them axially and vertically as required to place their respective jaws 76 and 80 below and above the glass sheet and inwardly of the edges thereof as limited by the stop lugs 103, 107.

Screws 78 are then rotated by turning wheels 82 to bring jaws 80 into engagement with the sheet S and securely clamp the same between jaws 80 and 76. Fluid under pressure is then introduced into the head end of cylinder 76 to extend piston rod 101 and bring abutment member 102 into engagement with the jaw plate 93 under a relatively light load.

Figure 5:
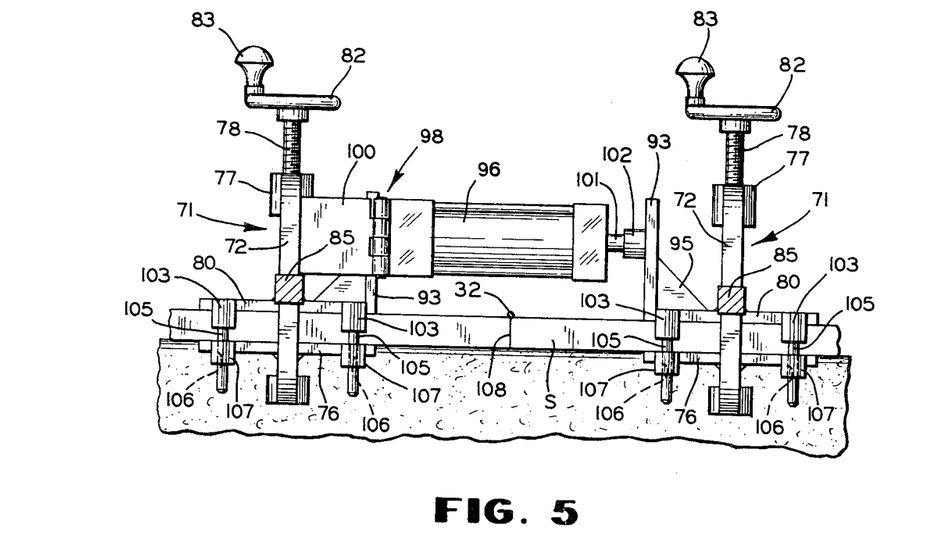
FIG. 5 is a vertical sectional view, on an enlarged scale, taken along the line 5—5 of FIG. 4.

An edge score, such as shown at 108 in FIG. 5, is formed on the leading edge of the sheet in alignment with the desired line of cut to initially penetrate the tension layer of the sheet S and thereby facilitate the start of the cut. If desired, this can be done before the wire 32 and clamps 71 are brought into their glass engaging positions. The electrical resistance heating element or wire 32 is then energized and the heat generated thereby is transmitted directly to the glass along the length of the desired line of cut to produce a thermal differential line through the thickness of the sheet. The conductive heat applied along this thermal differential line relieves some of the compression stresses in the compression layer as it migrates inwardly through the sheet thickness while proportionately increasing the tensile stresses in the intermediate tension layer until the latter reaches a level which, when assisted by the initially scored edge, creates a split or fracture in the tension layer along the thermal differential line. This fracture is propogated outwardly through the compression layers to the opposite surfaces of the glass sheet, the cut starting at the scored edge and progresssively running along the entire desired line of cut to the opposite or far edge of the glass sheet.

Just as the cut is started and advances from the scored edge a short distance, say from about 6 to 10 inches, fluid under increased pressure is introduced into the head end of cylinder 96 to extend piston rod 101 and urge abutment member 102 against the adjacent jaw plate 93, forcing the C-clamps 71 to move away from each other to effect a spreading apart of the severed glass portions, e.g. sheet S and strip S', clamped thereby. The stroke of piston rod 101 is approximately $\frac{1}{4}$-$\frac{1}{2}$ of an inch or just enough to physically move the severed portions apart without expending any thermal energy. Thus, the heavy severed glass portions are moved relatively away from each other by a mechanical force against the resistance offered by the felt covered table. This mechanical assist conserves the thermal energy that would otherwise be consumed in moving the severed glass portions apart so that all the available thermal energy is reserved and utilized solely for effecting the long running cut. Accordingly, the thermal energy necessary can be drastically reduced with a consequent reduction in the power requirements generating such energy.

Just before reaching the other so far end of the sheet, the running cut sometimes wanders uncontrollably or flares away from the intended line of cut. It is believed that this uncontrollable shearing or tearing is due, at least in part, to the opposite reaction forces acting horizontally inwardly in the plane of the sheet toward the line of the cut at the far end thereof resulting from the spreading apart or horizontal outward movement of the severed portions at the starting end of the cut. It should be noted that this deviating shear line at the far end of the intended line of cut extends for only a relatively short distance at the very end of the cut, say from about $\frac{1}{2}$ to 1 inch as compared to a dimensional cut of 200 inches or more. Generally, this does not pose any problems because the severed strip S', which contains the deviating sheared edge, is trimmed to size along a transverse line inwardly thereof so that the finished strip S' has a uniform width throughout. However, the present invention contemplates avoiding entirely such occasional deviation at the end of the running cut so as to consistently form true straight cuts from end to end.

To this end, means also are provided adjacent the remote end of the intended line of cut for urging apart the glass portions disposed on opposite sides of such line. Such means, generally designated 110, comprises a pair of laterally spaced vacuum cup assemblies 111 connected together by a fluid actuating cylinder 112, as will presently be described. Each assembly 111 includes a diaphragm or flexible vacuum cup 113 secured to an oblong supporting block 115. An L-shaped bracket 116 is rigidly secured along its horizontal leg 117 to block 115 and is provided with an opening therein for communication, via conduit 118, with a suitable suction source (not shown) for evacuating the interior of cup 113 and providing sufficient holding pressure to firmly secure the cup 113 to the glass sheet surface.

The means for connecting the vacuum cup assemblies 111 together includes the fluid cylinder 112 attached at its head and rod ends, respectively, to the upright legs 120 of brackets 116. In operation, and with a suction force imposed on the cups 113, fluid under slight pressure is supplied to the head end of cylinder 112 to maintain an outward pressure bias or load on the legs 120. As the advancing cut approaches the end of its run adjacent the cup assemblies 111, the bias provided by cylinder 112 urges the legs 120 and thereby the rear glass portions on opposite sides of the line of cut apart, causing these rear portions to move away from each other as the running cut reaches this region of the sheet. Thus, the glass sheet S is severed along a true straight line from the leading end to the trailing end thereof, leaving smooth and even opposed severed edges throughout and with such edges lying in a plane perpendicular to the opposed major surfaces of the sheet. As a result, it is not necessary to trim off the end portion of a finished strip S' and the length of the original blank or sheet needn't be oversized as would otherwise be required in conventional thermal cutting operations.

As a specific example, excellent results have been obtained in severing ¾ inch thick strips S' 204 inches long and 18 inches wide from a ¾ inch glass plate or sheet having a blank size of 204×137 inches using a "Nichrome 5" wire of 0.064 inch thickness. After the wire element 32 was placed against the glass, a current of approximately 23 amperes was introduced thereto, bringing the glass engaging wire to a temperature ranging from about 350° to 900° F., and preferably 750° F. Once the wire element 32 was energized, it took from about 2 to 5 minutes to complete a 204 inch dimensional cut, the variance in time being dictated by various factors, such as the type of glass, the voltage applied and the resistance of the wire. Lesser wire thicknesses, such as 0.051 and 0.040 inch for example, with a corresponding reduction in current amperage, also have yielded good results.

Figure 8:
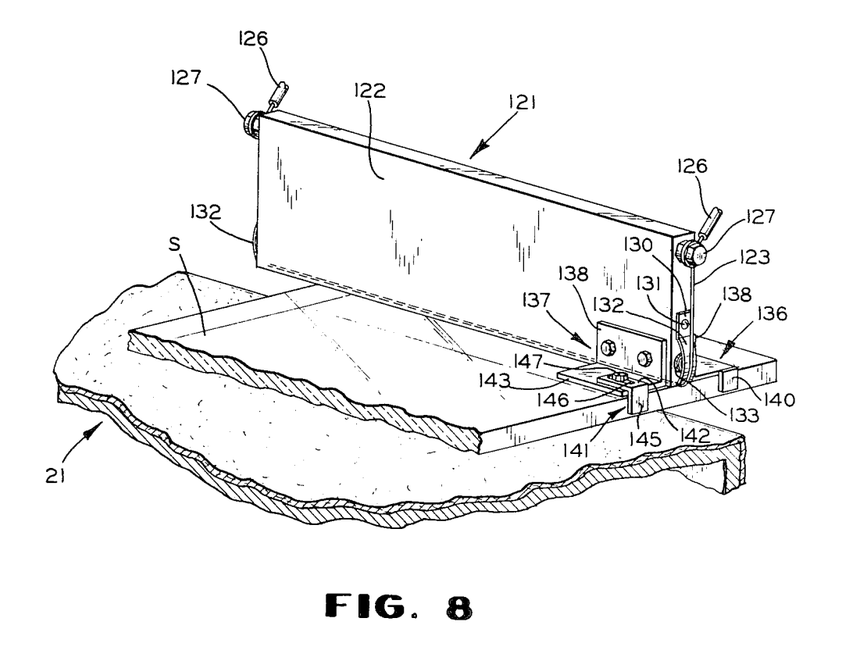
FIG. 8 is a perspective view of a glass trimming device, used in conjunction with this invention.
Figure 9:
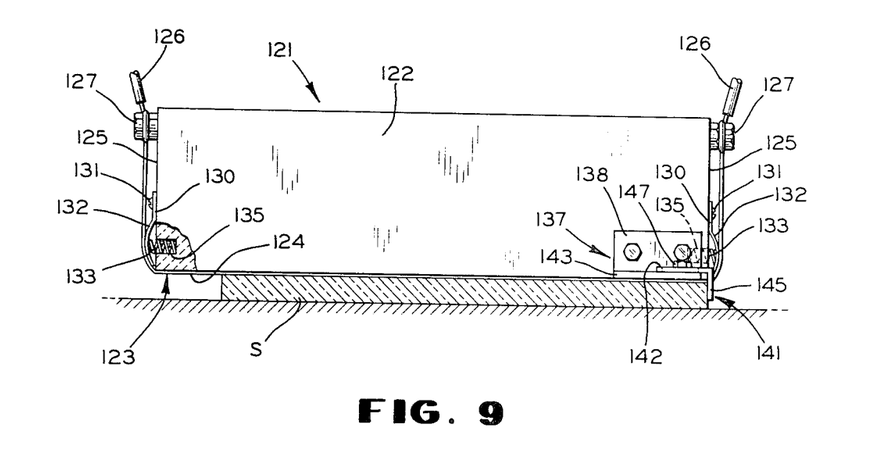
FIG. 9 is a front elevational view, on an enlarged scale ad partly in section, of the glass trimming device of FIG. 8.

FIGS. 8 and 9 illustrate a portable severing tool, generally designated 121, used in conjunction with this invention for removing the end portion of a glass strip S' trimming the latter to size, if desired. Tool 121 comprises a rectangularly shaped supporting strip or block 122 composed of a suitable heat and electrical insulating material, preferably of the type marketed under the tradename Marinite, for example. An electrical resistance wire 123 is provided with a major portion 124 extending along the bottom edge of block 122 and side portions extending upwardly along both block ends in spaced parallel relation to the end faces 125 of block 122. Wire 123 is secured at its opposite ends to threaded terminal posts projecting axially outwardly from the opposite ends of block 122 adjacent the upper end thereof. A pair of conductor leads 126 also is secured to the terminal posts, as by nuts 127, to connect the resistance wire 123 to a suitable electrical power source (not shown).

In order to maintain the wire 123 taut against the lower edge of block 122, a resilient finger 130 is secured to each end face 125 of block 122 by a suitable fastener 131. The finger 130 has a bowed portion 132 engageable with the vertically extending portion of wire 123. A helical spring 133, seated within a cavity 135 formed in the block end face 125, bears against the finger bowed portion 132 to urge the same outwardly for tensioning wire 123.

A pair of angle members 136 and 137 is rigidly secured along their vertical legs 138 to opposite sides of block 122 adjacent one end thereof. A lug 140 extends vertically downwardly from the outer side of the horizontal leg of angle member 136 and serves as an alignment stop engageable with one edge of the strip S' to be trimmed. An inverted L-shaped bracket 141 is adjustably connected along its horizontal leg 142 to the horizontal leg 143 of angle member 137. The downwardly extending vertical leg or lug 145 of bracket 141 serves as a guide stop also engageable with the one edge of strip S'. The horizontal leg 142 of bracket 141 is slotted, as shown at 146, to provide a fine adjustment for disposing the glass engaging faces of lugs 140 and 141 in a plane perpendicular to the wire element 123. Thus, the wire element 123 is oriented along a straight line truly perpendicular to the longitudinal edge of strip S'. A suitable fastener 147 inserted through slot 146 can be threaded into a tapped opening in leg 143 to secure bracket 141 in the selected adjusted position. Thus, angle members 136 and 137 serve to support the portable tool 121 in an upright position on the upper surface of strip S' and the guide lugs or stops 140 and 145 assure orienting the wire element 123 perpendicular to the longitudinal edges of the strip S'.

In use, the tool 121 is placed on the strip S' with guides 140 and 145 brought into engagement with one longitudinal edge of strip S' so as to accurately position wire element 123 perpendicular thereto along the intended transverse line of cut. Both longitudinal edges of the strip S' are then nicked to form score lines in alignment with the intended line of cut. Electrical current is then introduced into the electrical resistance wire 123 and the heat generated along wire 123 is transmitted directly to the glass along the desired transverse line to produce a thermal differential line inwardly through the thickness of the strip and which extends across the strip S'. This thermal differential line, as earlier explained in connection with wire 32, creates a split or fracture through the glass along such line across the width of the strip S' to trim such strip to size, leaving a smooth and even severed edge and which is perpendicular to the major surfaces of the strip S'.

From the foregoing, it is apparent that the objects of the present invention have been fully accomplished. As a result of this invention, a new and improved method and apparatus is provided for making elongated thermal cuts in relatively thick glass sheets in an improved and efficient manner by employing a glass surface contact, elongated electrical resistance wire for concentrating or localizing heat along the intended line of cut in conjunction with a mechanical assist for spreading the severed glass pieces apart as the running cut advances. This mechanical assist reserves all of the generated thermal energy for effecting the cut, assuring a straight cut along the intended path and leaving smooth and even severed edges having surfaces perpendicular to the planes of the opposed major surfaces. Forming the table top surface with an arched, convex configuration causes the heavy glass blank to assume a complementary shape and thereby avoid shear-resistant compressive forces in the surface of the blank. The electrical resistance heating wire, in turn, conforms to such glass surface curvature to assure continuous, uninterrupted contact therewith throughout the entire length of the intended cut. By the provision of a glass spreading mechanism adjacent the trailing or far end of the cut, true linear cuts in their entirety from end to end of the glass sheet can be consistently made. The novel method and apparatus set forth above is capable of producing severed edges on a glass body which are consistently clean and accurate and which can be readily utilized in a mass production operation. The provision of a portable severing tool facilitates glass trimming operations and can be readily adapted for use in the mass production cutting of relatively small block sizes.

It is to be understood that the forms of the invention herewith shown and described are to be taken as illustrative embodiments of the same, and that various changes in the shape, size and arrangement of parts, as well as various procedural changes, may be resorted to without departing from the spirit of the invention.

We claim:

1. In apparatus for cutting a heavy, thick glass sheet along an intended line of cut, including means for supporting a heavy sheet of glass to be cut and means overlying said glass supporting means for cutting said sheet along an intended line of cut, the improvement which consists in that said glass supporting means comprises a table having a supporting surface against which said sheet of glass rests in position to be cut, said supporting surface having a convex curvature causing said sheet to assume a complementary curvature when resting thereon, said convex supporting surface defining an arc having an axis extending normal to said intended line of cut.

2. Apparatus according to claim 1, including a layer of non-abrasive cloth material superimposed on said supporting surface and substantially coextensive therewith.

3. Apparatus according to claim 1, wherein said table is formed with an arcuately shaped top wall having an upper surface constituting said supporting surface.

4. Apparatus according to claim 3, wherein said top wall is perforated to provide flow of pressurized air therethrough.

5. Apparatus according to claim 1, wherein said cutting means comprises means for applying concentrated heat against one surface of said glass sheet along a narrow line coincident with a desired line of cut to cause said sheet to be severed progressively in a running cut along said line.

6. Apparatus according to claim 1, wherein the curvature of said convex supporting surface ranges from a radius of about 300 feet to a radius approaching a flat surface.

7. Apparatus according to claim 1, wherein the curvature of said convex supporting surface has a radius greater than 300 feet.

8. Apparatus according to claim 1, wherein the curvature of said convex supporting surface ranges from a radius of about 300 feet to a radius of approximately 2800 feet.

9. Apparatus according to claim 1, wherein the curvature of said convex supporting surface has a radius of 1111 feet.

10. Apparatus according to claim 1, wherein the apex of said convex supporting surface is less than ½ inch above the chord line connecting the ends of said convex supporting surface, said chord line having a linear dimension of approximately 200 inches.

11. Apparatus according to claim 10, wherein the apex of said convex supporting surface is approximately ⅜ of an inch above said chord line.

* * * * *